(12) United States Patent
Canni et al.

(10) Patent No.: US 11,506,638 B2
(45) Date of Patent: Nov. 22, 2022

(54) CONTACTLESS ODOMETER

(71) Applicant: Baker Hughes Oilfield Operations LLC, Houston, TX (US)

(72) Inventors: Giovanni Canni, Wallsend (GB); Jeffrey Earle Sutherland, Calgary (CA)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 162 days.

(21) Appl. No.: 17/113,281

(22) Filed: Dec. 7, 2020

(65) Prior Publication Data

US 2022/0178884 A1 Jun. 9, 2022

(51) Int. Cl.

| | |
|---|---|
| *G01N 27/9013* | (2021.01) |
| *G01N 29/04* | (2006.01) |
| *G01N 27/904* | (2021.01) |
| *G01N 27/9093* | (2021.01) |
| *G01P 3/64* | (2006.01) |
| *G01N 29/265* | (2006.01) |
| *G01N 29/22* | (2006.01) |

(52) U.S. Cl.
CPC ......... *G01N 29/225* (2013.01); *G01N 27/902* (2013.01); *G01N 27/904* (2013.01); *G01N 27/9093* (2013.01); *G01N 29/04* (2013.01); *G01N 29/265* (2013.01); *G01P 3/64* (2013.01); *G01N 2291/0234* (2013.01); *G01N 2291/0289* (2013.01); *G01N 2291/105* (2013.01); *G01N 2291/2636* (2013.01)

(58) Field of Classification Search
CPC .. G01N 29/225; G01N 27/905; G01N 27/904; G01N 27/902; G01N 27/9093; G01N 29/04; G01N 29/265; G01N 2291/0289; G01N 2291/0234; G01N 2291/2636; G01N 2291/105
USPC .......................................................... 73/601
See application file for complete search history.

(56) References Cited

U.S. PATENT DOCUMENTS

| | | | |
|---|---|---|---|
| 6,243,657 B1 * | 6/2001 | Tuck .................... | G01N 29/265 324/207.13 |
| 2003/0136195 A1 * | 7/2003 | Krieg .................... | G01N 29/07 73/628 |

(Continued)

FOREIGN PATENT DOCUMENTS

EP   1042691 A2 *  10/2000   ........... G01C 21/165

*Primary Examiner* — Jacques M Saint Surin
(74) *Attorney, Agent, or Firm* — Mintz Levin Cohn Ferris Glovsky and Popeo, PC; Lisa Adams

(57) ABSTRACT

A contactless odometer system can include a sensor array. The sensor array can include a plurality of sensing elements adjacent to a target surface and configured to receive signals based on a distance separating the sensing element from the adjacent surface and a defect present below the adjacent surface of the target. The system can also include a controller configured to receive the signals from first and second locations within the target and to generate first and second defect maps corresponding to the first and second locations. The controller can identify overlapping portions of first and second defect maps and can determine a translation distance in at least one direction. Related methods of determining a distance traveled by a contactless odometer system are also provided.

20 Claims, 5 Drawing Sheets

(56) References Cited

U.S. PATENT DOCUMENTS

2005/0145018 A1* 7/2005 Sabata .................. G01N 17/00
  73/49.1
2010/0211354 A1* 8/2010 Park ........................ G01V 8/12
  702/165

* cited by examiner

CONTACTLESS ODOMETER

BACKGROUND

Fluids (e.g., liquids and gases) can be conveyed through pipes for long-distance transportation and distribution. The environment surrounding pipes can subject pipes to a variety of service conditions (e.g., temperature variation, moisture, physical impact, etc.) that can give rise to corrosion and/or mechanical stress that result in leaks. Thus, pipes can be inspected for leaks during their lifetime in order to prevent pipe damage and deterioration, for example, in order to comply with environmental regulations and reduce operating and/or maintenance costs.

Pipeline inspection gauges (PIGs) can be employed for pipeline inspection. A PIG can include one or more sensors and can be dimensioned for insertion within the pipe. Under the influence of pressure within the pipe and/or its own locomotion, the PIG can travel through the pipe. During this travel, the sensor(s) can collect data that can be used to evaluate the condition of the pipe. As an example, defects such as surface pitting, corrosion, cracks, and/or weld defects, as well as attendant leaks, can be determined.

It can be desirable to correlate a defect detected within a pipe with its location so that the defect can be monitored and/or repaired. However, in general, PIGs are often unable to communicate outside of the pipe due to factors such as distance (e.g., underground or underwater pipelines) and/or the materials from which the pipe is made (e.g., metals). Thus, it can be helpful for a PIG to record a distance traveled within a pipe during inspection.

Odometers are one type of device that can be employed to measure a distance traveled by of a PIG. In general an odometer can be configured to measure the distance traveled by the PIG. By recording the starting position of the PIG, the distance measured by the odometer can be correlated to a position along a pipeline and a corresponding defect measurement in order to provide a location-specific defect map.

In general, odometers for PIGs can employ a wheel that placed against an interior surface of the pipeline. As the PIG moves, the wheel rotates. With knowledge of the circumference of the wheel and the number of rotations of the wheel, the distance traveled by the PIG can be estimated. As an example, a rotary encoder can be employed to measure wheel rotation.

However, the wheel can be exposed to debris and dirt and experience mechanical wear, which can result in skidding and failure. Skidding can introduce error into distance measurements acquired by an odometer, while failure of the wheel can render the odometer inoperable. Thus, there is a need for improved odometers for use with PIGs for pipeline inspection.

SUMMARY

In general, systems and methods of use for a contactless odometer are provided. In one aspect, a contactless odometer system is provided. The system can include a sensor array. The sensor array can include a plurality of sensing elements. Each sensing element can be configured to output a signal which can include an amplitude as a function of time in response to placement adjacent to a surface of a target. The amplitude of the signal output by a respective sensing element can be dependent upon a distance separating that sensing element from the adjacent target surface and a defect present below the adjacent target surface.

The system can also include a controller in signal communication with each of the plurality of sensing elements. The controller can be configured to receive first signals from at least a portion of the plurality of sensing elements when the sensor array is located at a first position with respect to the target surface. The controller can also be configured to receive second signals from at least a portion of the plurality of sensing elements when the sensor array is located at a second position with respect to the target surface. The second position of the sensor array can overlap with a portion of the first position of the sensor array. The controller can further be configured to generate a first defect map based upon the amplitude of the first signals and a relative position of the plurality of sensing elements with respect to one another within the sensor array. The controller can also be configured to generate a second defect map based upon the amplitude of the second signals and the relative position of the plurality of sensing elements with respect to one another within the sensor array. The controller can further be configured to identify an overlapping portion of the first and second defect maps. The controller can also be configured to determine a translation distance between the first and second positions in at least one direction based upon a location of the overlapping portion with respect to the first and second defect maps.

One or more of the following features can be included in any feasible combination. For example, the system can include a pipeline inspection gauge. The system can also include a suspension system coupled to the sensor array and the pipeline inspection gauge. The suspension system can be configured to maintain a sensing face of the sensor array at a constant distance from the adjacent surface of the target. The suspension system can also be configured to bias the sensing face of the sensor array in contact with the adjacent surface of the target. The plurality of sensing elements can be eddy current sensors.

The system can also include a magnetizer configured to magnetize the target adjacent to the sensor array. The plurality of sensing elements can include solid-state magnetic sensors, or coil-based magnetic sensors. The plurality of sensing elements can include ultrasonic sensors. The plurality of sensing elements can include non-optical sensors. The controller can be configured to determine the translation distance in two orthogonal directions. The controller can also be configured to determine a translation velocity of the sensor array when the sensor array is moved from the first position to the second position.

In another aspect, a method of determining a distance traveled by a contactless odometer system is provided. The method can include positioning a pipeline inspection gauge (PIG) within a pipe. The method can also include positioning a sensor array coupled to the PIG adjacent to an interior surface of the pipe. The sensor array can include a plurality of sensing elements configured to output a signal including an amplitude as a function of time. The signal amplitude can be dependent upon a distance separating a sensing face of the sensing element from an adjacent surface of a target and a defect present below the adjacent surface of the target. The method can further include moving the PIG within the pipe such that the sensor array can be located at a first position with respect to the interior surface of the pipe. The method can also include measuring, by at least a portion of the sensing elements, first signal corresponding to the first position of the sensor array. The method can also include moving the PIG within the pipe such that the sensor array can be located at a second position with respect to the interior surface of the pipe. The second position of the sensor array can overlap with at least a portion of the first position of the sensor array. The method can further include measuring, by at least a portion of the sensing elements, second signals corresponding to the second position of the sensor array. The method can also include generating, by a controller, a first defect map based upon the amplitude of the first signals and a relative position of the plurality of sensing elements with respect to one another within the sensor array. The method can further include, generating, by the controller, a second defect map based upon the amplitude of the second signals and the relative position of the plurality of sensing elements with respect to one another within the sensor array. The method can further include identifying an overlapping portion of the first and second defect maps. The method can also include determining a translation distance between the first and second positions in at least one direction based upon a location of the overlapping portion with respect to the first and second defect maps.

One or more of the following features can be included in any feasible combination. For example, the sensor array can be coupled to the PIG by a suspension system. The method can further include maintaining, by the suspending system, the sensing face of the sensor array at a constant distance from the adjacent surface of the target. The method can also include, biasing, by the suspension system, the sensing face of the sensor array in contact with the adjacent surface of the target. The plurality of sensing elements can be eddy current sensors. The plurality of sensing elements can include solid-state magnetic sensors or coil-based magnetic sensors and the method can further include magnetizing a portion of the target adjacent to the sensor array prior to measuring the first and second signals. The plurality of sensing elements can be ultrasonic sensors. The plurality of sensing elements can be non-optical sensors. The controller can be configured to determine the translational distance in two orthogonal directions. The controller can be configured to determine a translation velocity of the sensor array when the sensor array is moved from the first position to the second position.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

DESCRIPTION OF DRAWINGS

These and other features will be more readily understood from the following detailed description taken in conjunction with the accompanying drawings, in which.

Figure 1:
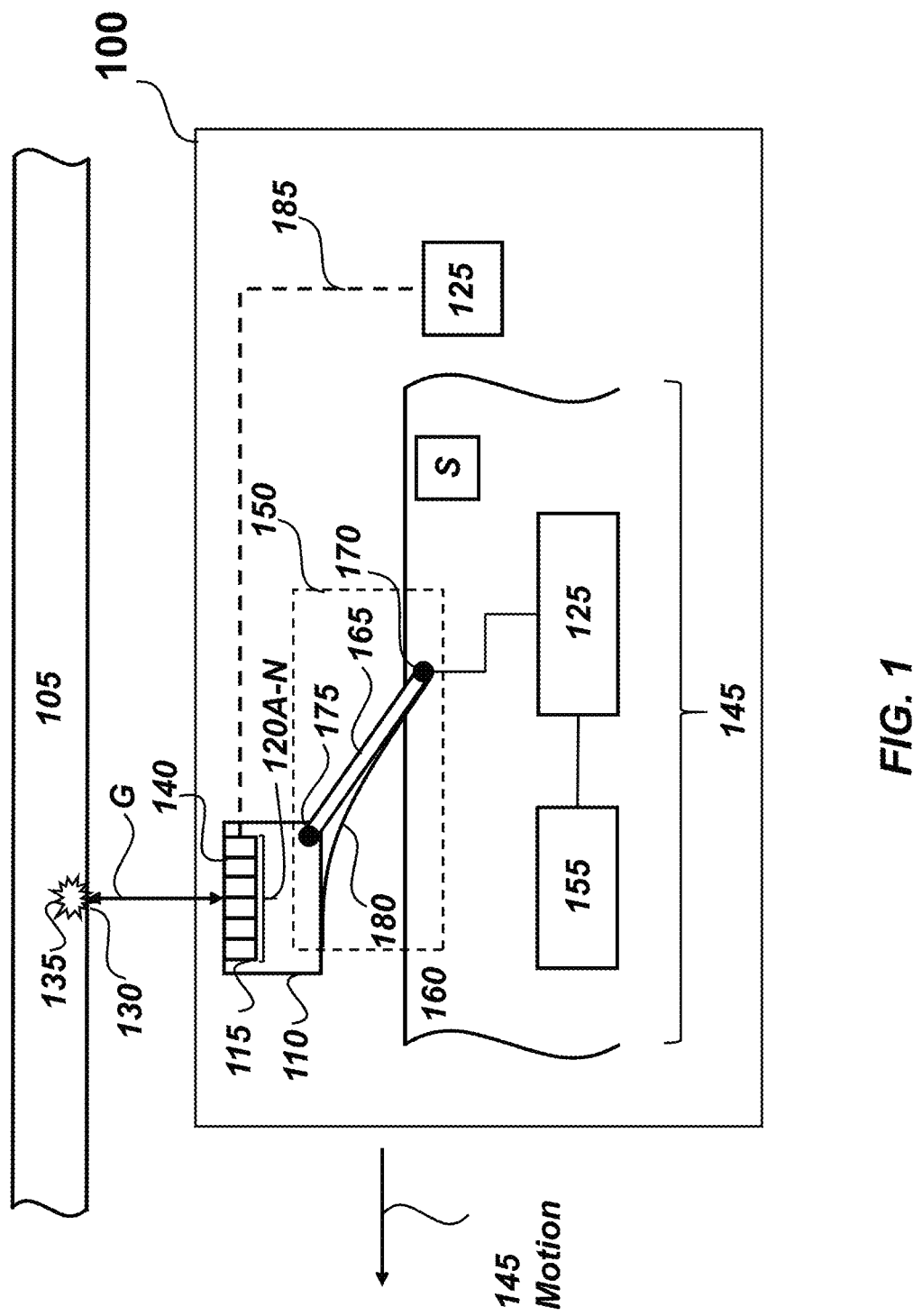
FIG. 1 is a diagram illustrating one exemplary embodiment of a contactless odometer system including a sensor array coupled to a pipeline inspection gauge (PIG)

It is noted that the drawings are not necessarily to scale. The drawings are intended to depict only typical aspects of the subject matter disclosed herein, and therefore should not be considered as limiting the scope of the disclosure.

DETAILED DESCRIPTION

Pipeline inspection can be performed using a pipeline inspection gauge (PIG). A PIG can be configured to travel within a pipe and conduct measurements at one or more locations within the pipe. Measurements can be obtained by moving the PIG to a location at which a measurement is desired and controlling the operation of sensors configured within the PIG to acquire the measurements. To obtain measurements at a particular location, a PIG can be configured with an odometer to measure an amount of distance traveled by the PIG. For example, a PIG configured with an odometer may be used to determine that a defect exists within the pipe at a first location. The first location can be located an amount of distance from an insertion point at which the PIG is inserted into the pipe. Thus the odometer can determine the distance to the defect. PIG operators must navigate the PIG from an insertion point to a defect based on the distance to the defect.

Odometer systems of traditional PIGs can include a wheel that is in direct physical contact with the pipe, or object being inspected. The wheel can be coupled to an encoder used to determine an amount of distance the wheel and the PIG have traveled within the pipe. In order to accurately determine the distance traveled, the wheel must be in direct physical contact with the pipe. Wheel-based odometer systems can require a number of moving parts to determine the amount of distance traveled. Thus, wheel-based odometer systems can require obtaining and maintaining an inventory of suitable replacement parts. Failure of wheel-based odometer systems can cause delayed inspection schedules and reduce production rates in order to locate and install a suitable replacement part. In addition, wheel-based odometer systems can require additional space to accommodate the necessary moving parts. As such, wheel-based odometer systems can require a larger size PIG and stronger suspension systems to secure the odometer to the PIG and maintain the wheel in contact with the pipe. The larger size of wheel-based odometer systems also means that inspection of smaller diameter pipes may be limited or even infeasible.

Wheel-based odometer systems are also disadvantageous when debris, dirt, corrosion, or obstructions are present within the pipe. Because the wheel-based odometer system maintains contact with the pipe to obtain distance measurements, the presence of debris, corrosion, or similar foreign material within the pipe, can cause wheel-based odometer systems to slip, skid, or even fail. Distance measurements, as well as any sensing measurements obtained by sensors configured on a PIG including a wheel-based odometer system can include errors resulting from the contact of the odometer wheel and the debris, dirt, or obstruction within the pipe.

An improved odometer system is provided herein. The improved odometer system includes a contactless odometer configured to determine an amount of distance traveled without requiring direct physical contact between the odometer system components and an object. The contactless odometer system described herein provides the benefit of determining a distance traveled in a pipe in the presence of dirt, debris or other obstructions present in the pipe. The contactless odometer system requires few moving parts and is less likely to experience failure or require replacement of moving parts found in wheel-based odometer systems. As a result, the contactless odometer system can be configured on smaller-sized PIGs which require lighter-weight suspension systems. Contactless odometer systems can reduce overall maintenance and operational costs for PIG operators due to having fewer moving parts and can be used in a larger variety of pipe diameters than wheel-based odometer systems.

FIG. 1 is a diagram illustrating one exemplary embodiment of a contactless odometer system 100 for use inspecting a target 105. As shown in FIG. 1, the contactless odometer system 100 includes a sensor head 110, a sensor array 115 including a plurality of sensing elements 120A-P, and a controller 125. The sensor array 115 can positioned within the sensor head 110 and each of the sensing elements 120A-P can be configured to output respective signals dependent upon a gap distance "G" separating the adjacent surface 130 of the target 105 from the sensing elements 120A-P, as well as the presence of a defect 135 within the adjacent target surface 130. In certain embodiments, the sensor array 115 can be positioned within the sensor head 110, adjacent to or in contact with a sensing face 140 (e.g., a generally planar face) of the sensor head 110. Thus, as discussed herein, the gap distance G separating the sensing elements 120A-P from the target surface 130 is assumed to be the same as the distance separating the sensing face 140 from the target surface 130.

In use, the sensor head 110 can be positioned proximate to the target 105 to allow the sensor elements 120A-P to acquire signals. As an example, the sensor head 110 can be coupled to a vehicle 145, such as a PIG as shown in FIG. 1, by a suspension system shown within the dashed line of box 150. The vehicle 145 can include a motor 155 and a drivetrain (not shown) mounted to the vehicle frame 160 that controls movement of the vehicle 145, and therefore the sensor head 110, with respect to the target 105. In this manner, the sensor head 110 can be moved laterally (e.g., horizontally) between different locations of the target 105. As shown, the target 105 is a pipe and the vehicle 145 is a pipeline inspection gauge (PIG) dimensioned for receipt within the pipe. In some embodiments, the target 105 can be a metal structure such as a pipe, a drain, a conduit or the like. In some embodiments, the target 105 includes ferrous metal structures.

As shown in FIG. 1, the suspension system 150 can include a suspension arm 165 extending between a first end and a second end. A first end of the suspension arm 165 can be coupled to the vehicle frame 160 at a first pivotable joint 170 and a second end of the suspension arm can be attached to the sensor head 110 at a second pivotable joint 175. A reversibly deformable member 180 (e.g., a spring) can also extend between the vehicle frame 160 and the sensor head 110. Under circumstances where the vehicle 145 moves upwards with respect to the sensor array 115, the first end of the suspension arm 165 can rotate counter-clockwise with respect to the first joint 170, the second end of the suspension arm 165 can rotate counter-clockwise with respect to the second joint 175, and the deformable member 180 can reversibly deform (e.g., bend, compress, etc.) to accommodate at least a portion of the upward motion of the vehicle 145. Conversely, under circumstances where the vehicle 145 moves downwards with respect to the sensor array 115, the first end of the suspension arm 165 can rotate clockwise with respect to the first joint 170, the second end of the suspension arm 165 can rotate clockwise with respect to the second joint 175, and the deformable member 180 can reversibly deform (e.g., elongate) to accommodate at least a portion of the downward motion of the vehicle 145.

As the sensor head 110 can be relatively light, the deformable member 180 can maintain the gap distance G approximately constant as the vehicle 145 moves with respect to the target 105 by exerting a relatively low biasing force, for example, a force of approximately 5 N to 10 N. Embodiments of the suspension system 150 can adopt a variety of configurations. However, in general, the suspension system 150 can be configured to maintain a vertical position of the sensor head 110 approximately constant as the vehicle 145 moves horizontally (laterally) with respect to the target 105. That is, the suspension system 150 can be configured to support the weight of the sensor head 110 and to dampen force transmitted from the vehicle frame 160 to the sensor head 110. By minimizing out of plane movement of the sensor head 110 with respect to the target 105 (e.g., movement towards or away from the target surface 130), the signal amplitude at a given location of the target 105 can represent a unique combination of the geometry of the target 105 (e.g., gap distance G) and the geometry or microstructure of the defect 135 which may be present or absence at that location 130.

The controller 125 can coupled to the sensor head 110 (and to the plurality of sensor elements 120A-P therein) via the suspension arm 165. In some embodiments, as shown in dashed line 185, the controller 125 can be coupled to the plurality of sensor elements 120A-P and can be configured separately from the PIG 145. Thus, the controller 125 can be in signal communication with each of the plurality of sensing elements 120A-P and can be configured to receive respective signals therefrom. Based upon the amplitude of the signals measured by respective sensing elements 120A-P and the relative position of those sensing elements 120A-P with respect to one another within the sensor array 115, the controller can generate maps of signal amplitude as a function of position.

A signal map can include a representation of received signal data such that the representation presents the data in a pixel-wise distribution which corresponds to the location of the sensing elements in the sensor array. Signal maps generated in this manner can be employed to measure distance traveled by the vehicle 145 and to determine a defect map which can be associated with one or more defect detected during movement by the vehicle 145. As an example, during movement of the vehicle 145, signal maps can be generated at a predetermined frequency. Signal maps generated successively in time can be compared to one another and an overlapping portion of each signal map can be determined. With knowledge of the length scale of the signal map, the distance traveled by the vehicle 145 and the velocity of the vehicle 145 during the time between generation of the successive signal maps can be determined.

Figure 3:
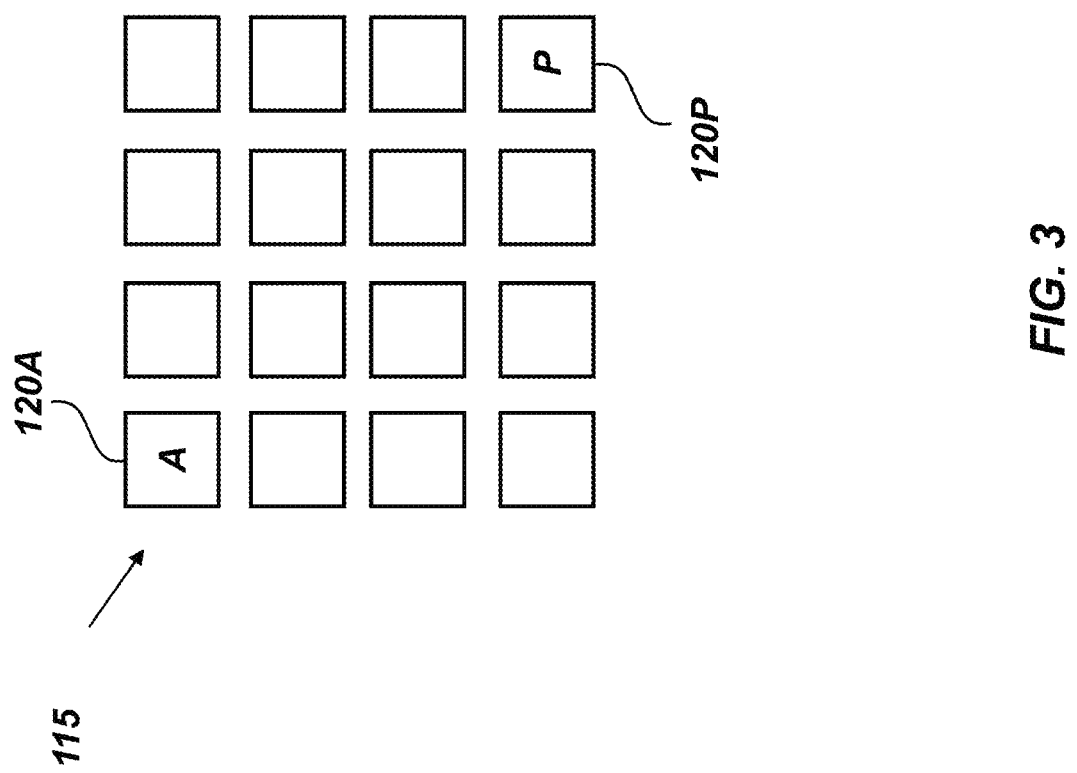
FIG. 3 is a diagram illustrating one exemplary embodiment of a sensor array of the contactless odometer system of FIG. 1.

FIG. 3 is a diagram illustrating one exemplary embodiment of a sensor array of the contactless odometer system of FIG. 1. The sensor array 115 can include a number of sensor elements 120. In some embodiments, the sensor array 115 can include 1-5, 2-8, 6-10, 8-15, or 10-20 sensor elements 120. In some embodiments, the sensor array 115 can include greater than 20 sensor elements 120, such as 20-40 sensor elements 120. Although FIG. 3, shows the sensor elements 120 arranged in a grid or matrix-like arrangement with similar numbers of sensor elements 120 in each row and in each column, a variety of other arrangements are possible. For example, the sensor elements 120 can be arranged within the sensor array 115 in a linear, radial, or grouped arrangement. In a grouped arrangement, a first region of the sensor array 115 can include a difference number of sensor elements 120 than a second region of the sensor array 115. In addition, in some embodiments, each sensor element 120 can include a unique identifier, such as sensor element 120A or 120P. The controller can utilize the unique identifier of each sensor element 120 to process the signals received from each uniquely identified sensor element. In one embodiment, the sensing elements 120 can be configured to transmit signals to the controller 125 over a specific channel (e.g., a physical transmission medium such as a wire or a logical connection over a multiplexed medium such as a radio channel). In another aspect, the sensing elements can be configured to add a unique identifier to the signal for identification.

In some embodiments, the sensor elements 120 can include non-optical sensor elements, such as ultrasonic current sensors, and/or magnetic sensors. In some embodiments, the sensor elements 120 can include eddy current sensors. In some embodiments, the sensor elements 120 can include solid-state magnetic sensors, such as Hall effect sensors or magnetoresistive sensors, as well as coil-based magnetic sensors capable of measuring magnetic or electromagnetic fields. In some embodiments, the sensor elements 120 can include a combination of magnetic sensors. In some embodiments, the sensor elements 120 can include ultrasonic sensors such as piezoelectric sensors, phase array based sensors, acoustic resonance (AR) sensors, and electromagnetic acoustic transduction (EMAT) sensors.

Figures 4A, 4B:
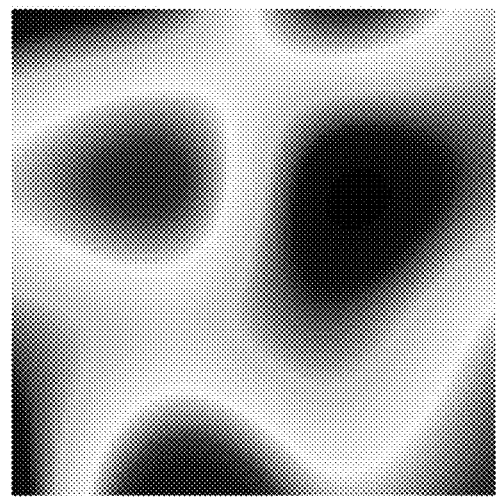
FIG. 4A is a diagram illustrating one exemplary embodiment of a defect map measured by the sensor array of FIG. 1.
FIG. 4B is a diagram illustrating a quantized defect map corresponding to the defect map of FIG. 4A.

FIG. 4A is a diagram illustrating one exemplary embodiment of a defect map measured by the sensor array of FIG. 1. The defect map shown in FIG. 4A can correspond to a signal map described previously. The defect map as shown in FIG. 4A can be generated based on the signals received by the plurality of sensor elements 120A-P at a particular location.

FIG. 4B is a diagram illustrating a quantized defect map corresponding to the defect map of FIG. 4A. As shown in FIG. 4B, portions of the defect map have been evaluated against threshold values and the portions can be assigned an identifier, such as "0" or "1" depending on whether or not the signal received by the respective sensor element 120 was above or below the threshold value indicating a defect. In some embodiments, the controller 125 can compare the amplitude of the received signal to a predetermined threshold value. For some types of sensors, an amplitude greater than the threshold value can represent the absence of a defect, while an amplitude less than the threshold can represent the presence of a defect. For other types of sensors, an amplitude greater than the threshold value can represent the presence of a defect, while an amplitude less than the threshold can represent the absence of a defect. Thus, regardless of the type of sensor, the controller can be configured to identify the presence or absence of defects for each signal. As shown in FIG. 3, for example, portions of the defect map identified with a "0" may indicate signal values from corresponding portions of the target 105 which may include a defect. Portions of the defect map identified with a "1" may indicate signal values from corresponding portions of the target 105 which may be free of defects.

Figure 2:
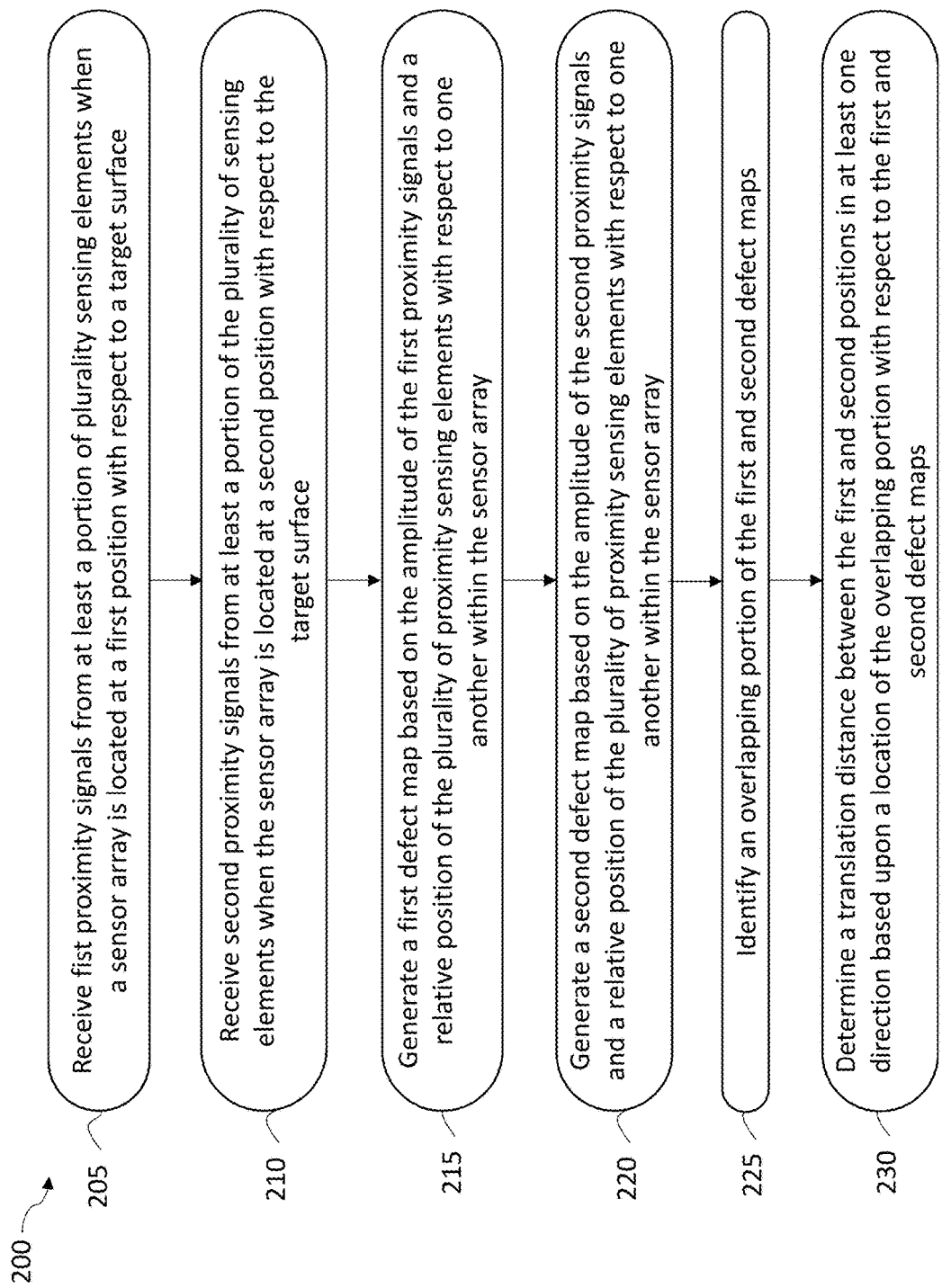
FIG. 2 is a flow diagram illustrating one exemplary embodiment of a method for determining a distance traveled by the contactless odometer system of FIG. 1.
Figure 5:
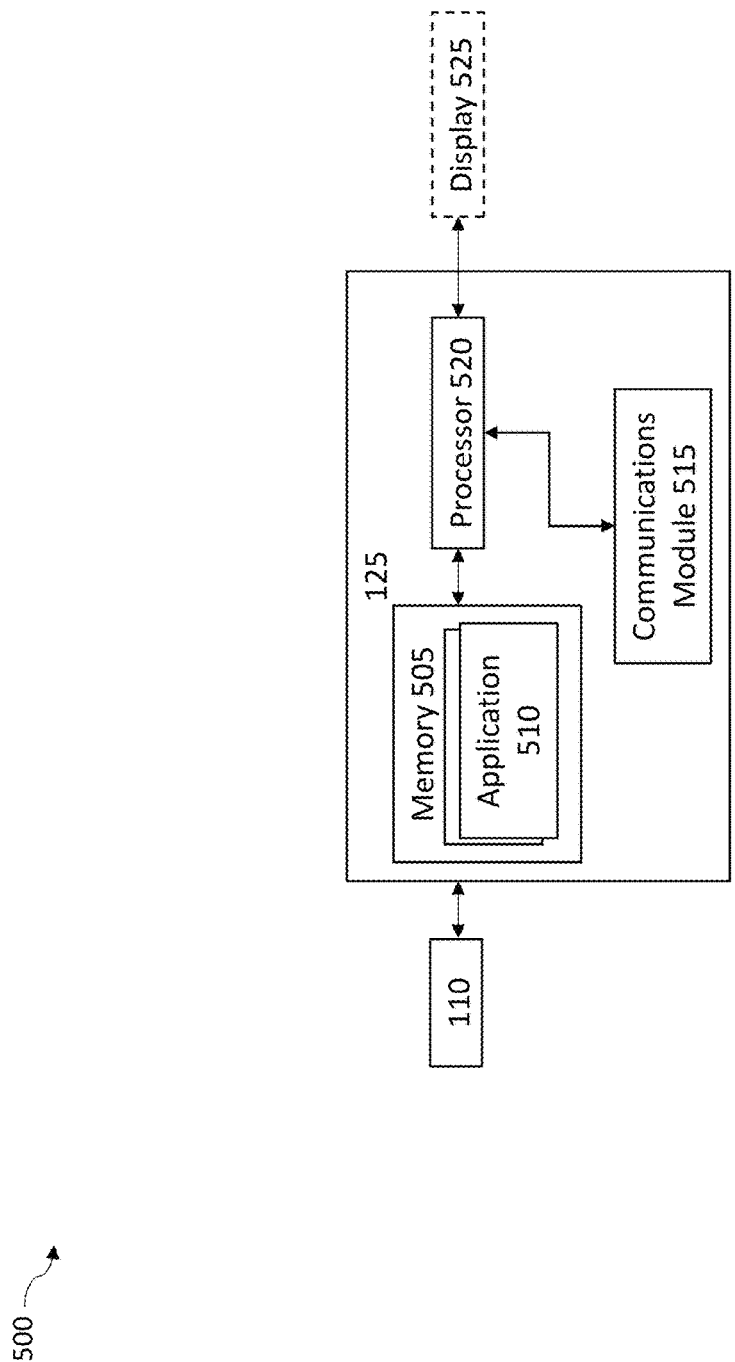
FIG. 5 is a diagram illustrating one exemplary embodiment of a controller of the contactless odometer system of FIG. 1.

FIG. 5 is a diagram illustrating one exemplary embodiment of an architecture 500 of a controller 125 of the contactless odometer system 100 of FIG. 1. The controller 125 can be configured with programmable instructions to perform the operations of the method 200 described in relation to FIG. 2 for determining a distance traveled by the contactless odometer system 100 of FIG. 1.

The controller 125 includes a memory 505 storing computer-readable, executable instructions for determining a distance traveled using a contactless odometer system 100. The memory 505 can also include signals generated by the plurality of sensor elements 120. The memory 505 can also store one or more defect maps generated based on the signals as well as threshold values used to determine the presence of defects based on the received signals. The memory 505 can also include one or more image processing algorithms used to generate defect maps and identify overlapping portions of defect maps. The memory 505 can also include one or more applications 510. The applications 510 can include user and programming interfaces for determining a distance traveled using the contactless odometer system 100.

The controller 125 also includes a communications module 515. The communications module 515 can transmit computer-readable instructions and/or data stored in or received by the controller 125 to other components which may be coupled via wired or wireless connections. For example, the controller 125 can transmit instructions to the sensor array 110 via the communications module and cause the sensor array 110 to receive signals for defect map generation.

As shown in FIG. 5, the controller 125 includes a processor 520. The processor 520 operates to execute the computer-readable instructions and/or data stored in memory 505 and to transmit the computer-readable instructions and/or data via the communications module 515. The processor 520 is configured to execute the operations of method 200 described in relation to FIG. 2.

In some embodiments the controller can be coupled to a display 525. The display can be configured separately from the contactless odometer system 100 and can be coupled to the controller to output the defect maps and/or the travel distance determined for the contactless odometer system 100.

Embodiments of a contactless odometer system and method for determining a distance traveled within a pipe are discussed herein. The system and method can measure a distance travelled within a pipe without requiring the system to maintain direct contact with the pipe. However, embodiments of the disclosure are not limited to pipes or pipe geometries and can be employed to measure distances traveled with respect to any object without limit.

Exemplary technical effects of the systems and methods described herein include, by way of non-limiting example determining a distance traveled by a contactless odometer system. The systems and methods described herein provide the benefit of determining a distance traveled by a pipeline inspection system without requiring direct physical contact with the pipe or object being inspected. In this way, the contactless odometer system can determine the distance and generate defect maps using a light-weight suspension system that includes fewer moving parts than wheel-based odometer systems. In addition, the contactless odometer system described herein can be provided in a smaller form factor, such as a smaller PIG 145 or vehicle frame 160, because there are fewer moving parts within the contactless odometer system 100.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A contactless odometer system, comprising:
a sensor array including a plurality of sensing elements, each sensing element configured to output a signal including an amplitude as a function of time in response to placement adjacent to a surface of a target, wherein the amplitude of the signal output by a respective sensing element is dependent upon a distance separating that sensing element from the adjacent target surface and a defect present below the adjacent target surface; and
a controller in signal communication with each of the plurality of sensing elements, the controller configured to:
  receive first signals from at least a portion of the plurality of sensing elements when the sensor array is located at a first position with respect to the target surface;
  receive second signals from at least a portion of the plurality of sensing elements when the sensor array is located at a second position with respect to the target surface, wherein the second position of the sensor array overlaps with a portion of the first position of the sensor array;
  generate a first defect map based upon the amplitude of the first signals and a relative position of the plurality of sensing elements with respect to one another within the sensor array;
  generate a second defect map based upon the amplitude of the second signals and the relative position of the plurality of sensing elements with respect to one another within the sensor array;
  identify an overlapping portion of the first and second defect maps; and
  determine a translation distance between the first and second positions in at least one direction based upon a location of the overlapping portion with respect to the first and second defect maps.

2. The system of claim 1, further comprising:
a pipeline inspection gauge; and
a suspension system coupled to the sensor array and the pipeline inspection gauge.

3. The system of claim 2, wherein the suspension system is configured to maintain a sensing face of the sensor array at a constant distance from the adjacent surface of the target.

4. The system of claim 2, wherein the suspension system is configured to bias the sensing face of the sensor array in contact with the adjacent surface of the target.

5. The system of claim 1, wherein the plurality of sensing elements are eddy current sensors.

6. The system of claim 1, further comprising a magnetizer configured to magnetize the target adjacent to the sensor array, wherein the plurality of sensing elements are solid-state magnetic sensors or coil-based magnetic sensors.

7. The system of claim 1, wherein the plurality of sensing elements are ultrasonic sensors.

8. The system of claim 1, wherein the plurality of sensing elements are non-optical sensors.

9. The system of claim 1, wherein the controller is configured to determine the translation distance in two orthogonal directions.

10. The system of claim 1, wherein the controller is configured to determine a translation velocity of the sensor array when the sensor array is moved from the first position to the second position.

11. An method, comprising:
positioning a pipeline inspection gauge (PIG) within a pipe;
positioning a sensor array coupled to the PIG adjacent to an interior surface of the pipe, the sensor array including a plurality of sensing elements configured to output a signal including an amplitude as a function of time, wherein the signal amplitude is dependent upon a distance separating a sensing face of the sensing element from an adjacent surface of a target and a defect present below the adjacent surface of the target;
moving the PIG within the pipe such that the sensor array is located at a first position with respect to the interior surface of the pipe;
measuring, by at least a portion of the sensing elements, first signals corresponding to the first position of the sensor array;
moving the PIG within the pipe such that the sensor array is located at a second position with respect to the interior surface of the pipe, wherein the second position of the sensor array overlaps with at least a portion of the first position of the sensor array;
measuring, by at least a portion of the sensing elements, second signals corresponding to the second position of the sensor array;
generating, by a controller, a first defect map based upon the amplitude of the first signals and a relative position of the plurality of sensing elements with respect to one another within the sensor array;
generating, by the controller, a second defect map based upon the amplitude of the second signals and the relative position of the plurality of sensing elements with respect to one another within the sensor array;
identifying an overlapping portion of the first and second defect maps; and
determining a translation distance between the first and second positions in at least one direction based upon a location of the overlapping portion with respect to the first and second defect maps.

12. The method of claim 11, wherein the sensor array is coupled to the PIG by a suspension system.

13. The method of claim 12, further comprising maintaining, by the suspension system, the sensing face of the sensor array at a constant distance from the adjacent surface of the target.

14. The method of claim 12, further comprising, by the suspension system, biasing the sensing face of the sensor array in contact with the adjacent surface of the target.

15. The method of claim 11, wherein the plurality of sensing elements are eddy current sensors.

16. The method of claim 11, wherein the plurality of sensing elements include solid-state magnetic sensors or coil-based magnetic sensors; and the method further comprises magnetizing a portion of the target adjacent to the sensor array prior to measuring the first and second signals.

17. The method of claim 11, wherein the plurality of sensing elements are ultrasonic sensors.

18. The method of claim 11, wherein the plurality of sensing elements are non-optical sensors.

19. The method of claim 11, wherein the controller is configured to determine the translation distance in two orthogonal directions.

20. The method of claim 11, wherein the controller is configured to determine a translation velocity of the sensor array when the sensor array is moved from the first position to the second position.

\* \* \* \* \*